(12) United States Patent
Yanase et al.

(10) Patent No.: US 8,998,681 B2
(45) Date of Patent: Apr. 7, 2015

(54) GEAR GRINDING METHOD

(75) Inventors: Yoshikoto Yanase, Tokyo (JP); Masashi Ochi, Tokyo (JP); Yasuhiro Nakamichi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 81 days.

(21) Appl. No.: 13/882,448

(22) PCT Filed: Nov. 25, 2011

(86) PCT No.: PCT/JP2011/077124
§ 371 (c)(1),
(2), (4) Date: Jun. 28, 2013

(87) PCT Pub. No.: WO2012/105114
PCT Pub. Date: Aug. 9, 2012

(65) Prior Publication Data
US 2013/0288576 A1    Oct. 31, 2013

(30) Foreign Application Priority Data

Jan. 31, 2011  (JP) .................................. 2011-017445

(51) Int. Cl.
*B24B 53/07*  (2006.01)
*B23F 1/02*  (2006.01)
*B23F 19/00*  (2006.01)

(52) U.S. Cl.
CPC ............... *B23F 1/02* (2013.01); *B23F 19/002* (2013.01)

(58) Field of Classification Search
CPC ........ B24B 53/075; B24B 53/06; B24B 53/07
USPC ..................... 451/47, 56, 443, 72; 409/26, 51
See application file for complete search history.

(56) References Cited

U.S. PATENT DOCUMENTS 4,650,378 A * 3/1987 Zubler ............................. 409/12
4,850,155 A * 7/1989 Sulzer .............................. 451/47

(Continued)

FOREIGN PATENT DOCUMENTS

GB    1 547 512    9/1977
JP    53-44992 A   4/1978

(Continued)

OTHER PUBLICATIONS

International Search Report and Written Opinion of the International Searching Authority with English translation.
Notice of Allowance dated Jan. 27, 2015 for corresponding Taiwanese Application No. 101101116 with an English Translation.

*Primary Examiner* — George Nguyen
(74) *Attorney, Agent, or Firm* — Birch, Stewart, Kolasch & Birch, LLP

(57) ABSTRACT

Provided is a gear grinding method capable of improving processing accuracy and easily adjusting the crowning shape by simplifying a processing operation. To this end, a work piece (W) is ground by a gear-shaped grinding stone (11) having a drum shape such that crowning along a tooth trace direction is applied to the work piece (W) by applying a relative feed in a feed direction (D1) that intersects a work piece rotation axis (C1) at a predetermined first diagonal angle (θ1) between the work piece (W) and the gear-shaped grinding stone (11) while the work piece (W) and the gear-shaped grinding stone (11) are synchronously rotated in the state of being engaged so as to have a predetermined crossed axes angle (Σ), and the curvature in a grinding stone width direction, which defines the drum shape of the gear-shaped grinding stone (11), and the first diagonal angle (θ1) are set according to the crowning shape of the work piece (W).

2 Claims, 5 Drawing Sheets

(56) References Cited

U.S. PATENT DOCUMENTS

| | | | |
|---|---|---|---|
| 4,947,590 A | | 8/1990 | Schapp et al. |
| 5,175,962 A | * | 1/1993 | Pedersen ........................... 451/5 |
| 5,289,815 A | * | 3/1994 | Krenzer ..................... 125/11.03 |
| 5,325,634 A | * | 7/1994 | Kobayashi et al. ........... 451/253 |
| 5,573,449 A | * | 11/1996 | Mackowsky .................... 451/47 |
| 6,217,409 B1 | * | 4/2001 | Stadtfeld et al. ................... 451/5 |
| 2002/0019195 A1 | | 2/2002 | Asano et al. |
| 2002/0119737 A1 | | 8/2002 | Tan |
| 2005/0272354 A1 | * | 12/2005 | Kidowaki et al. ............. 451/219 |
| 2008/0292420 A1 | | 11/2008 | Faulstich |

FOREIGN PATENT DOCUMENTS

| | | |
|---|---|---|
| JP | 1-127219 A | 5/1989 |
| JP | 2002-506739 A | 3/2002 |
| JP | 2003-326457 A | 11/2003 |
| JP | 2008-290234 A | 12/2008 |
| JP | 2010 29992 A | 2/2010 |
| JP | 2010-158749 A | 7/2010 |
| TW | 405470 U | 9/2000 |

\* cited by examiner

Fig.1
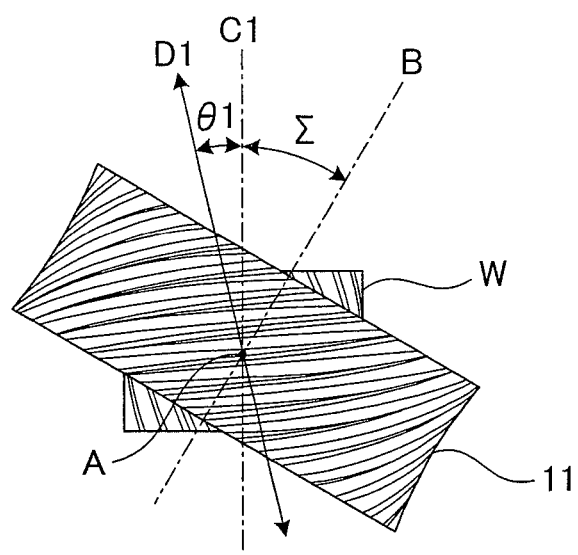
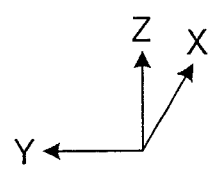

Fig.2
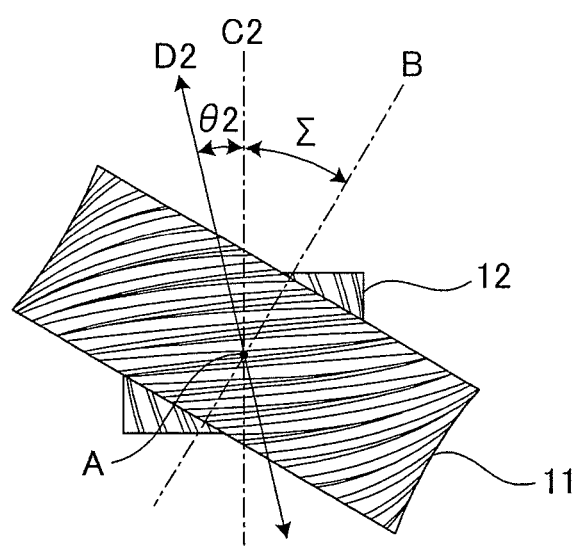
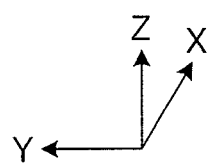

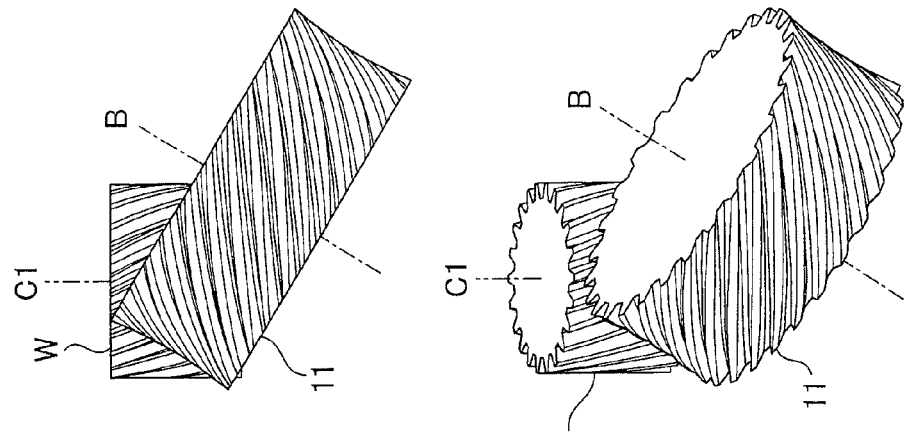
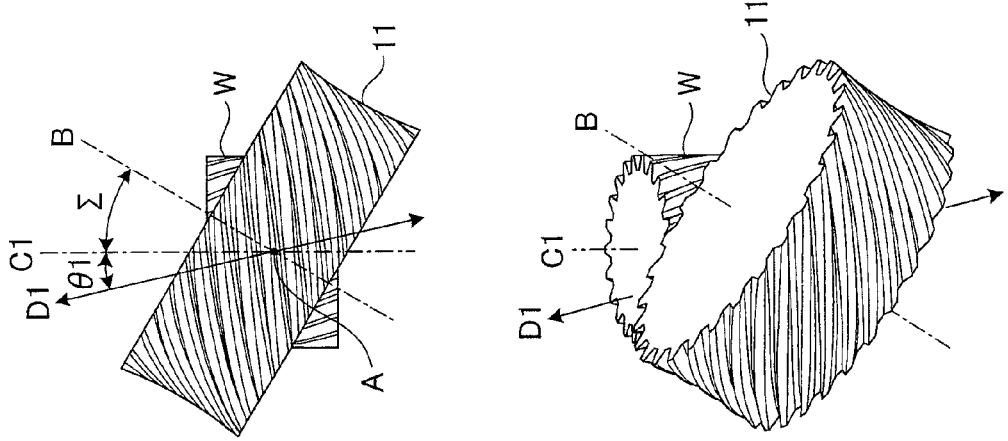
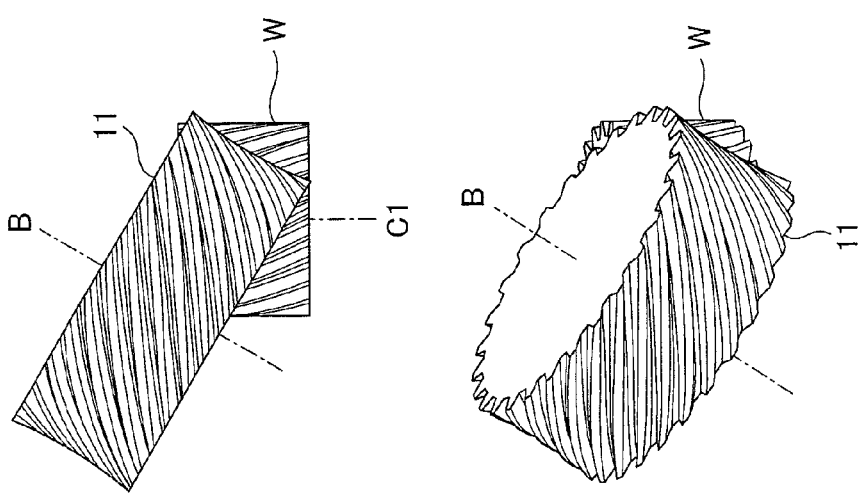

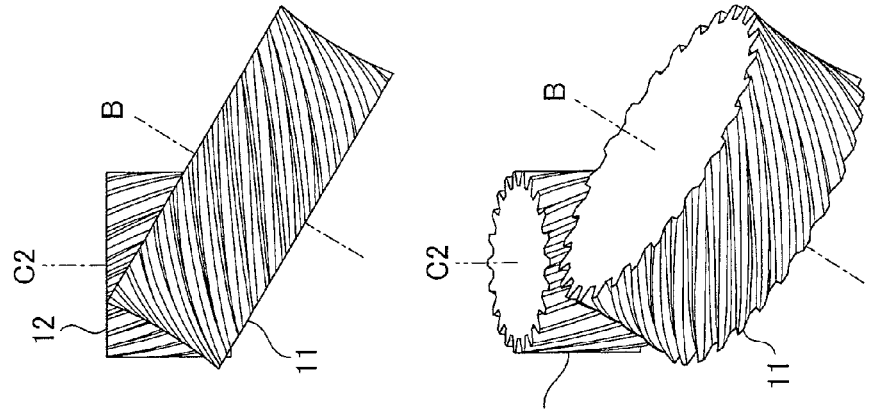
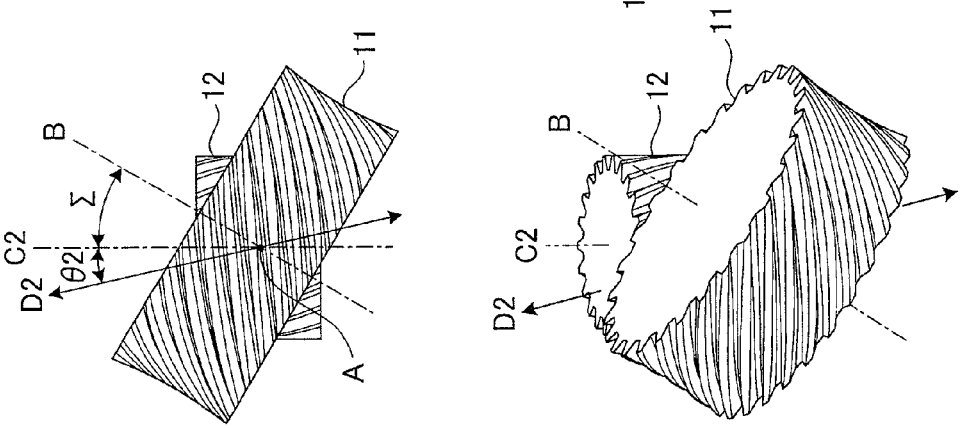
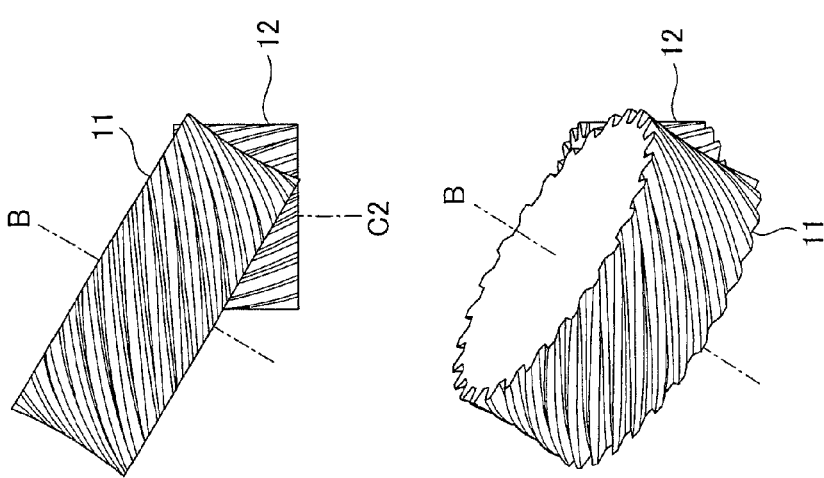

GEAR GRINDING METHOD

TECHNICAL FIELD

The present invention relates to a gear grinding method in which crowning is applied to a tooth surface of a gear when the tooth surface of the gear is to be ground.

BACKGROUND ART

A gear is general means for transmitting drive force, but gear noise (noise or vibration) is generated in some cases when gears are in mesh with each other.

Conventionally, to solve the problem mentioned above, a crowning process is generally performed on a tooth surface of a gear. The crowning process is processing by which crowning bulging in an arc shape is formed along a tooth trace direction on the tooth surface of the gear. The crowning process described above can be achieved by applying machining in such a way that a tooth thickness is gradually reduced from a central portion in the tooth trace direction to both end portions in the tooth trace direction. Since the meshing of the gears is made smooth by performing the crowning process as described above, the gear noise can be reduced.

In addition, when crowning is applied to the gear subjected to heat treatment, the crowning process is generally performed at the same time as grinding. In the grinding, a grinding wheel is moved in an arc in such a way as to follow the shape of the crowning, and the arc movement of the grinding wheel is enabled by adjusting a center distance between the gear and the grinding wheel according to the crowning shape. For example, Patent Document 1 discloses a gear grinding method in which crowning is applied to the tooth surface of the gear as described above.

PRIOR ART DOCUMENT

Patent Document

Patent Document 1: Japanese Patent Application Publication No. 2008-290234

SUMMARY OF THE INVENTION

Problems to be Solved by the Invention

In the conventional gear grinding method, the crowning process is performed in such a manner that a diagonal ratio between a gear and an hourglass-shaped tool is adjusted while the gear and the hourglass-shaped tool are synchronously rotated in mesh with each other at a predetermined crossed axes angle. Moreover, when the crowning shape of a tooth surface is to be adjusted, a center distance between the gear and the hourglass-shaped tool is adjusted.

Accordingly, in the conventional gear grinding method, it is necessary to adjust the center distance between the gear and the hourglass-shaped tool according to the crowning shape while performing feeding operations. Additionally, in the case where the center distance between the gear and the hourglass-shaped tool is adjusted according to the crowning shape, in the switching of quadrant (reversing) in the arc movement, trajectory errors called quadrant glitches may be caused due to the backlash or the like of a drive force transmission mechanism.

Consequently, the machining operations of the gear and the hourglass-shaped tool become complicated. Moreover, since the quadrant glitches affect machining accuracy, the machining accuracy of the gear, i.e. grinding machining accuracy including crowning process accuracy may be reduced.

On the other hand, another gear grinding method in which crowning is applied to a tooth surface of a gear by using a grinding wheel dressed with a dress gear is also conventionally provided. In such a gear grinding method, however, the crowning shape of the dress gear needs to be adjusted in the case of changing the crowning shape of the gear. The operations of the adjustment are thus very troublesome.

Accordingly, the present invention has been made to solve the above problem, and an object thereof is to provide a gear grinding method capable of improving machining accuracy and easily adjusting the shape of crowning by simplifying machining operations.

Means for Solving the Problems

A gear grinding method according to a first aspect of the invention which solves the problems described above is characterized in that the method comprises grinding a gear to be machined with a gear-shaped grinding wheel having an hourglass shape in such away that crowning along a tooth trace direction is applied to the gear to be machined by feeding the gear to be machined and the gear-shaped grinding wheel relative to each other in a feed direction intersecting a workpiece rotation axis of the gear to be machined at a predetermined first diagonal angle while synchronously rotating the gear to be machined and the gear-shaped grinding wheel in mesh with each other at a predetermined crossed axes angle, and a curvature in a grinding wheel width direction defining the hourglass shape of the gear-shaped grinding wheel and the first diagonal angle are set according to a crowning shape of the gear to be machined.

A gear grinding method according to a second aspect of the invention which solves the problems described above is characterized in that a dress gear is provided, the dress gear configured in such a way that the dress gear and the gear-shaped grinding wheel are fed relative to each other in a feed direction intersecting a gear rotation axis of the dress gear at a predetermined second diagonal angle while being synchronously rotated in mesh with each other at the crossed axes angle, thereby dressing the gear-shaped grinding wheel, and the curvature in the grinding wheel width direction defining the hourglass shape of the gear-shaped grinding wheel is set by adjusting the second diagonal angle.

Effects of the Invention

Hence, in the gear grinding method according to the present invention, when the gear to be machined and the gear-shaped grinding wheel are fed relative to each other in the feed direction along the first diagonal angle, the curvature in the grinding wheel width direction defining the hourglass shape of the gear-shaped grinding wheel and the first diagonal angle are set according to the crowning shape of the gear to be machined. In this way, the machining operations can be simplified. Accordingly, the machining accuracy of the gear to be machined can be improved and the crowning shape of the gear to be machined can be easily adjusted.

BRIEF DESCRIPTION OF THE DRAWINGS

FIG. 1 shows a gear grinding method according to an embodiment of the present invention, and is a view showing a state where a gear-shaped grinding wheel grinds a workpiece.

FIG. 2 is a view showing a state where a dress gear performs dressing on the gear-shaped grinding wheel.

FIG. 3 Parts (a) to (c) of FIG. 3 are views sequentially showing how the gear-shaped grinding wheel grinds the workpiece.

FIG. 5 Parts (a) to (c) of FIG. 5 are views each sequentially showing how the dress gear performs dressing on the gear-shaped grinding wheel.

MODE FOR CARRYING OUT THE INVENTION

Figure 4:
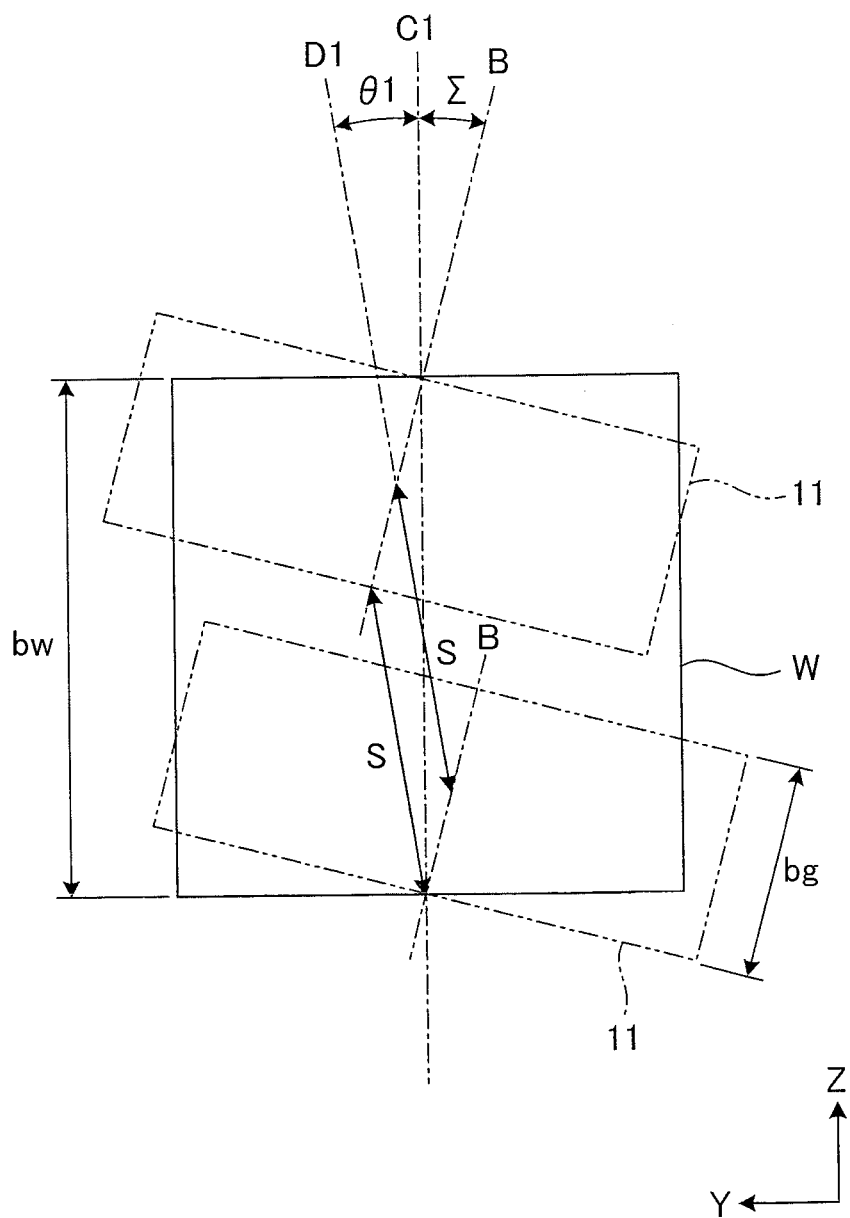
FIG. 4 is a view showing how the gear-shaped grinding wheel moves in a feed direction.

A gear grinding method according to the present invention will be described below in detail by using the drawings.

EMBODIMENT

As shown in FIG. 1, a gear grinding machine (not shown) employing the gear grinding method according to the present invention grinds a workpiece (gear to be machined) W which is a helical gear with a gear-shaped grinding wheel 11 having the shape of an hourglass while performing crowning of a tooth surface of the gear. Moreover, as shown in FIG. 2, the gear grinding machine has a dressing function to perform dressing on the gear-shaped grinding wheel 11 with a dress gear 12 on the machine.

Next, an attachment structure for grinding and dressing in the gear grinding machine will be described by using FIG. 1 and FIG. 2.

Firstly, as shown in FIG. 1, when the grinding is performed, the workpiece W is provided in the gear grinding machine to be rotatable about a workpiece rotation axis C1 extending in a vertical Z-axis direction. The workpiece W is a workpiece which has been subjected to heat treatment after gear cutting, and is formed to have a workpiece width (face width) bw.

Additionally, when the grinding is performed, the gear-shaped grinding wheel 11 is provided in the gear grinding machine to be rotatable about a grinding wheel rotation axis B, and is supported to be movable: in a horizontal X-axis direction (cutting direction) which is a center distance between the grinding wheel rotation axis B and the workpiece rotation axis C1; in a horizontal Y-axis direction orthogonal to the X-axis direction and the Z-axis direction; and in the Z-axis direction.

Moreover, the gear-shaped grinding wheel 11 is provided to be turnable about a grinding wheel turning axis A extending in the X-axis direction. By turning the gear-shaped grinding wheel 11 about the grinding wheel turning axis A as describe above, a crossed axes angle Σ between the grinding wheel rotation axis B and the workpiece rotation axis C1 can be adjusted according to the helix angles of the workpiece W and the gear-shaped grinding wheel 11. In other words, the crossed axes angle Σ in grinding is an angle formed between the grinding wheel rotation axis B and the workpiece rotation axis C1 in a Y-Z plane, and the gear-shaped grinding wheel 11 in grinding rotates about the grinding wheel rotation axis B with the crossed axes angle Σ formed according to the helix angles of the workpiece W and the gear-shaped grinding wheel 11.

Here, the gear-shaped grinding wheel 11 is formed into the helical gear shape, and is also formed into such an hourglass shape that an outer diameter dimension of the gear-shaped grinding wheel 11 becomes larger from a central portion in a grinding wheel width direction (grinding wheel axis direction) toward both end portions in the grinding wheel width direction (grinding wheel axis direction). In other words, the hourglass shape which is an outer shape in the grinding wheel width direction in the gear-shaped grinding wheel 11 is defined by a predetermined curvature. In addition, a grinding wheel width (blade width) of the gear-shaped grinding wheel 11 is formed to be bg (bg<bw), and a blade surface thereof is continuously helically formed over the entire area of the gear-shaped grinding wheel 11 in the grinding wheel width direction.

As described above, the gear-shaped grinding wheel 11 is formed in such a way that the outer shape of the gear-shaped grinding wheel 11 in the grinding wheel width direction has the hourglass shape, and the grinding wheel width bg is made shorter than the workpiece width bw. The gear-shaped grinding wheel 11 can be thereby meshed with the workpiece W in such a way as to be in line contact with the workpiece W across the entire width in the grinding wheel width direction.

Then, the gear-shaped grinding wheel 11 is subjected to cutting in the X-axis direction from the state where the gear-shaped grinding wheel 11 is in mesh with the workpiece W. Thereafter, the gear-shaped grinding wheel 11 is fed in a feed direction D1 which is a direction oblique to the workpiece rotation axis C1. In this way, the tooth surface of the workpiece W is crowned along a tooth trace direction when a tooth surface of the workpiece W is ground by the blade surface of the gear-shaped grinding wheel 11.

In addition, the feed direction D1 is a direction intersecting the workpiece rotation axis C1 at a predetermined diagonal angle θ1 in the Y-Z plane. Accordingly, the shape of crowning (the crowning application amount and the curvature of the crowning in the tooth trace direction) on the tooth surface of the workpiece W can be set by adjusting the curvature in the grinding wheel width direction defining the hourglass shape of the gear-shaped grinding wheel 11 and the diagonal angle θ1.

To be specific, since the gear-shaped grinding wheel 11 is formed in the hourglass shape, as the diagonal angle θ1 becomes larger, the crowning application amount of the gear-shaped grinding wheel 11 to the workpiece W also becomes larger along with the movement of the gear-shaped grinding wheel 11 in the feed direction D1. On the other hand, since the gear-shaped grinding wheel 11 is formed in the hourglass shape, as the diagonal angle θ1 becomes smaller, the crowning application amount of the gear-shaped grinding wheel 11 to the workpiece W also becomes smaller along with the movement of the gear-shaped grinding wheel 11 in the feed direction D1.

In addition, as shown in FIG. 2, when the dressing is performed, the dress gear 12 is provided in the gear grinding machine to be rotatable about a gear rotation axis C2 disposed on the same axis as the workpiece rotation axis C1. The dress gear 12 has the same gear specification as the gear specification of the workpiece W, and is capable of meshing with the gear-shaped grinding wheel 11.

Specifically, by turning the gear-shaped grinding wheel 11 about the grinding wheel turning axis A, the crossed axes angle Σ between the grinding wheel rotation axis B and the gear rotation axis C2 can be adjusted according to the helix angles of the gear-shaped grinding wheel 11 and the dress gear 12. Additionally, the crossed axes angle Σ in dressing is an angle formed between the grinding wheel rotation axis B and the gear rotation axis C2 in the Y-Z plane, and the gear-shaped grinding wheel 11 in dressing rotates about the grinding wheel rotation axis B while the crossed axes angle Σ is formed according to the helix angles of the gear-shaped grinding wheel 11 and the dress gear 12. Note that the crossed axes angle Σ in grinding and the crossed axes angle Σ in dressing are set at the same angle.

Then, the gear-shaped grinding wheel 11 is subjected to cutting in the X-axis direction from the state where the gear-shaped grinding wheel 11 is in mesh with the workpiece W. Thereafter, the gear-shaped grinding wheel 11 is fed in a feed direction D2 which is a direction oblique to the gear rotation axis C2. In this way, the outer shape of the gear-shaped grinding wheel 11 in the grinding wheel width direction can be formed into the hourglass shape when the blade surface of the gear-shaped grinding wheel 11 is dressed by a tooth surface (blade surface) of the dress gear 12.

In addition, the feed direction D2 is a direction intersecting the gear rotation axis C2 at a predetermined diagonal angle θ2 in the Y-Z plane. Accordingly, the curvature of the hourglass shape in the gear-shaped grinding wheel 11 can be set by adjusting the diagonal angle θ2.

To be specific, as the diagonal angle θ2 becomes larger, the curvature of the hourglass shape in the gear-shaped grinding wheel 11 becomes smaller. On the other hand, as the diagonal angle θ2 becomes smaller, the curvature of the hourglass shape in the gear-shaped grinding wheel 11 becomes larger.

Next, operations for grinding and dressing in the gear grinding machine will be described by using FIG. 3 to FIG. 5.

When the workpiece W is to be ground by the gear-shaped grinding wheel 11, the desired crowning shape for the tooth surface of the workpiece W is firstly set. In association with this, the outer shape of the gear-shaped grinding wheel 11 in the grinding wheel width direction is formed in advance to have the hourglass shape with the predetermined curvature according to the crowning shape. Additionally, the diagonal angle θ1 is also set in advance at a predetermined angle according to the crowning shape.

Next, as shown in Part (a) of FIG. 3, the gear-shaped grinding wheel 11 is moved in the X-axis, Y-axis and Z-axis directions, and is turned about the grinding wheel turning axis A to be set at the crossed axes angle Σ. In this state, the gear-shaped grinding wheel 11 is in mesh with an upper end portion of the workpiece W in a face width direction.

Then, from the above meshed state, the gear-shaped grinding wheel 11 is subjected to cutting in the X-axis direction. Thereafter, the gear-shaped grinding wheel 11 is rotated about the grinding wheel rotation axis B while the workpiece W is rotated about the workpiece rotation axis C1.

Subsequently, the gear-shaped grinding wheel 11 is moved in the Y-axis and Z-axis directions and thereby fed in the feed direction D1 extending at the diagonal angle θ1. In this way, as shown in Parts (a) to (c) of FIG. 3, the gear-shaped grinding wheel 11 is moved from the upper end portion of the workpiece W in the face width direction, through a central portion of the workpiece W in the face width direction, to a lower end portion of the workpiece W in the face width direction, while being always in line contact with the workpiece W across the entire width in the grinding wheel width direction.

Consequently, because of the synchronous rotation and the crossed axes angle Σ between the gear-shaped grinding wheel 11 and the workpiece W, sliding occurs between the blade surface of the gear-shaped grinding wheel 11 and the tooth surface of the workpiece W. The tooth surface of the workpiece W is thereby finely ground by the blade surface of the gear-shaped grinding wheel 11.

Additionally, the gear-shaped grinding wheel 11 is formed into the hourglass shape when grinding operations are performed as described above. Accordingly, as the gear-shaped grinding wheel 11 moves toward the upper end portion of the workpiece W in the face width direction and toward the lower end portion of the workpiece W in the face width direction, the interference amount of the gear-shaped grinding wheel 11 with the workpiece W becomes larger. The desired crowning is thereby applied to the tooth surface of the workpiece W in such a way that the central portion of the workpiece W in the tooth trace direction bulges gently.

Moreover, as described above, the amount of crowning on the tooth surface of the workpiece W can be set by adjusting the curvature of the hourglass shape in the gear-shaped grinding wheel 11 and the diagonal angle θ1. Here, as shown in FIG. 4, the amount of stroke of the gear-shaped grinding wheel 11 in the feed direction D1 can be set to become smaller as the diagonal angle θ1 becomes larger.

To be specific, if the amount of stroke of the gear-shaped grinding wheel 11 in the feed direction D1 is referred to as S, the amount of stroke S can be expressed by the following equation.

$$S = bg \times \sin \Sigma / \sin \theta 1 \qquad (1)$$

As obvious from the above equation (1), it can be understood that the amount of stroke S becomes smaller as the diagonal angle θ1 becomes larger. Accordingly, since the amount of stroke S of the gear-shaped grinding wheel 11 becomes smaller by making the diagonal angle θ1 larger, it is possible to reduce machining time.

Furthermore, the grinding operations are performed with the gear-shaped grinding wheel 11 meshed with the workpiece W in such a way to be in line contact with the workpiece W across the entire width in the grinding wheel width direction. For this reason, all the blade surfaces on the gear-shaped grinding wheel 11 can be used as grinding surfaces. This can increase the grinding area in the gear-shaped grinding wheel 11 and the life of the grinding wheel can be made long.

When a predetermined number of the workpieces W are ground by using the gear-shaped grinding wheel 11, the blade surfaces are worn and the sharpness of the blade surfaces is reduced. For this reason, the gear-shaped grinding wheel 11 needs to be periodically dressed by the dress gear 12.

Then, when the gear-shaped grinding wheel 11 is to be dressed by the dress gear 12, the diagonal angle θ2 is firstly set in advance at a predetermined angle according to the curvature of the hourglass shape in the gear-shaped grinding wheel 11.

Next, as shown in Part (a) of FIG. 5, the gear-shaped grinding wheel 11 is moved in the X-axis, Y-axis and Z-axis directions, and is turned about the grinding wheel turning axis A to be set at the crossed axes angle Σ. In this state, the gear-shaped grinding wheel 11 is in mesh with an upper end portion of the dress gear 12 in a face width direction.

Then, from the above meshed state, the gear-shaped grinding wheel 11 is subjected to cutting in the X-axis direction. Thereafter, the gear-shaped grinding wheel 11 is rotated about the grinding wheel rotation axis B while the dress gear 12 is rotated about the gear rotation axis C2.

Subsequently, the gear-shaped grinding wheel 11 is moved in the Y-axis and Z-axis directions and thereby fed in the feed direction D2 extending at the diagonal angle θ2. In this way, as shown in Parts (a) to (c) of FIG. 5, the gear-shaped grinding wheel 11 is moved from the upper end portion of the dress gear 12 in the face width direction, through a central portion of the dress gear 12 in the face width direction, to a lower end portion of the dress gear 12 in the face width direction, while being always in line contact with the dress gear 12 across the entire width in the grinding wheel width direction. The blade surface of the gear-shaped grinding wheel 11 is thus dressed by the tooth surface (blade surface) of the dress gear 12.

Additionally, as described above, the curvature of the hourglass shape in the gear-shaped grinding wheel 11 can be set by adjusting the diagonal angle θ2. When the crowning shape on the tooth surface of the workpiece W is to be changed, the curvature of the hourglass shape in the gear-shaped grinding wheel 11 and the diagonal angle θ1 may be set by adjusting the diagonal angle θ2. A high degree of flexibility in the adjustment can be thereby achieved in an adjustment method for adjusting the crowning shape on the tooth surface of the workpiece W.

Consequently, in the gear grinding method according to the present invention, when the gear-shaped grinding wheel 11 having the hourglass shape is fed in the feed direction D1 extending at the diagonal angle θ1, the curvature in the grinding wheel width direction defining the hourglass shape of the gear-shaped grinding wheel 11 and the diagonal angle θ1 are set according to the crowning shape on the tooth surface of the workpiece W, thereby simplifying the grinding operations. For this reason, grinding machining accuracy including crowning process accuracy in the workpiece W can be improved, and the crowning shape on the tooth surface of the workpiece W can be easily adjusted.

In addition, a high degree of flexibility in the crowning shape can be achieved by adjusting the diagonal angle θ2 for performing dressing on the gear-shaped grinding wheel 11 to set the curvature in the grinding wheel width direction defining the hourglass shape of the gear-shaped grinding wheel 11.

INDUSTRIAL APPLICABILITY

The present invention is applicable to a gear grinding method for the purpose of reducing machining time.

The invention claimed is:

1. A gear grinding method characterized in that
   the method comprises grinding a gear to be machined with a gear-shaped grinding wheel having an hourglass shape in such a way that crowning along a tooth trace direction is applied to the gear to be machined by feeding the gear to be machined and the gear-shaped grinding wheel relative to each other in a feed direction intersecting a workpiece rotation axis of the gear to be machined at a predetermined first diagonal angle while synchronously rotating the gear to be machined and the gear-shaped grinding wheel in mesh with each other at a predetermined crossed axes angle, and
   a curvature in a grinding wheel width direction defining the hourglass shape of the gear-shaped grinding wheel and the first diagonal angle are set according to a crowning shape of the gear to be machined.

2. The gear grinding method according to claim 1, characterized in that
   a dress gear is provided, the dress gear configured in such a way that the dress gear and the gear-shaped grinding wheel are fed relative to each other in a feed direction intersecting a gear rotation axis of the dress gear at a predetermined second diagonal angle while being synchronously rotated in mesh with each other at the crossed axes angle, thereby dressing the gear-shaped grinding wheel, and
   the curvature in the grinding wheel width direction defining the hourglass shape of the gear-shaped grinding wheel is set by adjusting the second diagonal angle.

* * * * *